(12) United States Patent
Turner (10) Patent No.: US 6,761,511 B2
(45) Date of Patent: Jul. 13, 2004

(54) APPARATUS FOR MOUNTING A DRILL ON A PIPE

(76) Inventor: Gordon Henry Turner, 15 Aylesham Way, Yateley, Hampshire GU46 6NR (GB)

( * ) Notice: Subject to any disclaimer, the term of this patent is extended or adjusted under 35 U.S.C. 154(b) by 56 days.

(21) Appl. No.: 09/954,096

(22) Filed: Sep. 17, 2001

(65) Prior Publication Data

US 2003/0021645 A1 Jan. 30, 2003

(30) Foreign Application Priority Data

Jul. 26, 2001 (GB) .............................. 0118234

(51) Int. Cl.⁷ .............................................. B23B 41/08
(52) U.S. Cl. ............................ 408/92; 137/318; 408/88
(58) Field of Search ............................ 408/1 R, 92, 76, 408/88, 97, 234; 137/318

(56) References Cited

U.S. PATENT DOCUMENTS

| 309,085 A | * | 12/1884 | Payne | 408/111 |
| 436,609 A | * | 9/1890 | Mueller | 408/92 |
| 2,024,390 A | * | 12/1935 | Roesch | 408/111 |
| 3,741,670 A | * | 6/1973 | Wood | 408/92 |
| 3,922,107 A | * | 11/1975 | Fowler | 408/67 |
| 4,533,284 A | * | 8/1985 | Agius et al. | 408/92 |
| 4,936,720 A | * | 6/1990 | Dolatowski et al. | 408/75 |
| 5,051,044 A | * | 9/1991 | Allen | 408/92 |
| 5,713,702 A | * | 2/1998 | Turner | 408/88 |
| 6,050,753 A | * | 4/2000 | Turner | 408/88 |

FOREIGN PATENT DOCUMENTS

| DE | 150703 | * | 9/1981 | 408/72 R |
| JP | 124503 A | * | 7/1984 | 408/92 |

* cited by examiner

Primary Examiner—Daniel W. Howell
(74) Attorney, Agent, or Firm—Jackson Walker LLP (57) ABSTRACT

A V-shaped frame 102 is attached to a pipe 100 to be drilled. The frame may be used with larger pipes by attaching a removable extension plates 120 to the arms 104 106 of the V-shaped frame, thereby increasing the size of the recess between the arms 104, 106. The apparatus may be fixed to the pipe 100 by a chain 110 which connects to the platform 102 and extends around the pipe 100, or by attaching clips to the frame and attaching the clips to the surface of the pipe by screws etc.

17 Claims, 10 Drawing Sheets

APPARATUS FOR MOUNTING A DRILL ON A PIPE

This invention relates to an apparatus for mounting a drill on a pipe, and in particular to an apparatus adapted to cope with pipes of large diameter.

One known method of holding a drill steadily against a pipe is using a magnetic system. This would include, for example, an electromagnetic holder, which when energised, holds a drill firmly against a metallic pipe, so that a hole may be drilled in a defined position in the pipe. However, a magnetic holder suffers from several major problems. It cannot be used with pipes made from a non-magnetic material, such as concrete, plastic, stainless steel, brass or clay. It cannot be used in environments which are particularly sensitive to electrical or magnetic fields, such as radar installations or computer factories. A separate safety chain has to be used as well, because in the event of a power failure to the electromagnetic clamp, care needs to be taken to ensure that the entire apparatus does not fall and injure operators who may be standing nearby. Also, magnetic mountings cannot withstand large forces without being becoming dislodged.

WO98/16353 discloses an apparatus for mounting a drill onto a pipe, in which a frame is clamped onto the pipe, and a drill press is adjustably mounted on the platform. The drill press stand can be adjusted relative to the platform, in a direction parallel to the axis of the pipe to be drilled, and the pipe may be drilled radially. By allowing the drill press stand to be adjusted relative to the platform, a more flexible arrangement is possible. One embodiment involves using a clamp which fits around the pipe, constructed from a front plate and a back plate held together by a series of screws. In a second embodiment, the clamping means is an inverted V-shape frame which sits on top of the pipe, and is connected at both sides to a chain which loops around the pipe. The chain can be tightened against the frame to fix the clamp in position. This is done by means of adjustable tension units which are fixed to the frame, and have chain holding hooks. The hooks can be raised or lowered relative to the frame, to tighten or loosen the chain.

The frame with the chain in WO98/16353 is more suitable than a simple rigid clamp for use in restricted space, due to the flexibility and relatively small volume of the chain. However, it is not readily suited for drilling into pipes of very large diameter. One problem is that the tension units pull the chain tight in a direction perpendicular to the platform. This works well for small pipes where the diameter of the pipe is not much larger than the width of the platform. However, for large pipes with diameter much larger than the width of the platform, the part of the chain which attaches to the tension units lies almost parallel to the surface of the pipe. Thus when the hook in the tension unit is raised to tighten the chain, it mainly has the effect of lifting up the end of the chain, rather than tightening it, and the amount by which the chain can be tightened is very small.

A second problem is that for large pipes, only a small part of the circumference of the pipe is encompassed within the inverted V shape of the platform. The platform is therefore likely to slip or become dislodged after it has been positioned. The chain would be unlikely to clamp tightly enough with such an arrangement, which would be a particular problem for a large pipe made from a hard material, such as a steel pipe of 70 cm diameter or more which had to have large holes drilled in situ. The chain might jump off the hook during drilling.

Although these problems might be eliminated by simply scaling the whole clamp to a very much larger size, the apparatus would then be unsuitable for smaller pipes, and extremely unwieldy.

Aspects of the invention are set forth in the accompanying independent claims and preferred features are set forth in the dependent claims.

The present invention will now be described, by way of example only, and with reference to the accompanying drawings, in which:

FIG. 6b shows a side elevational view of the bracket of FIG. 6a.

Figure 1A:
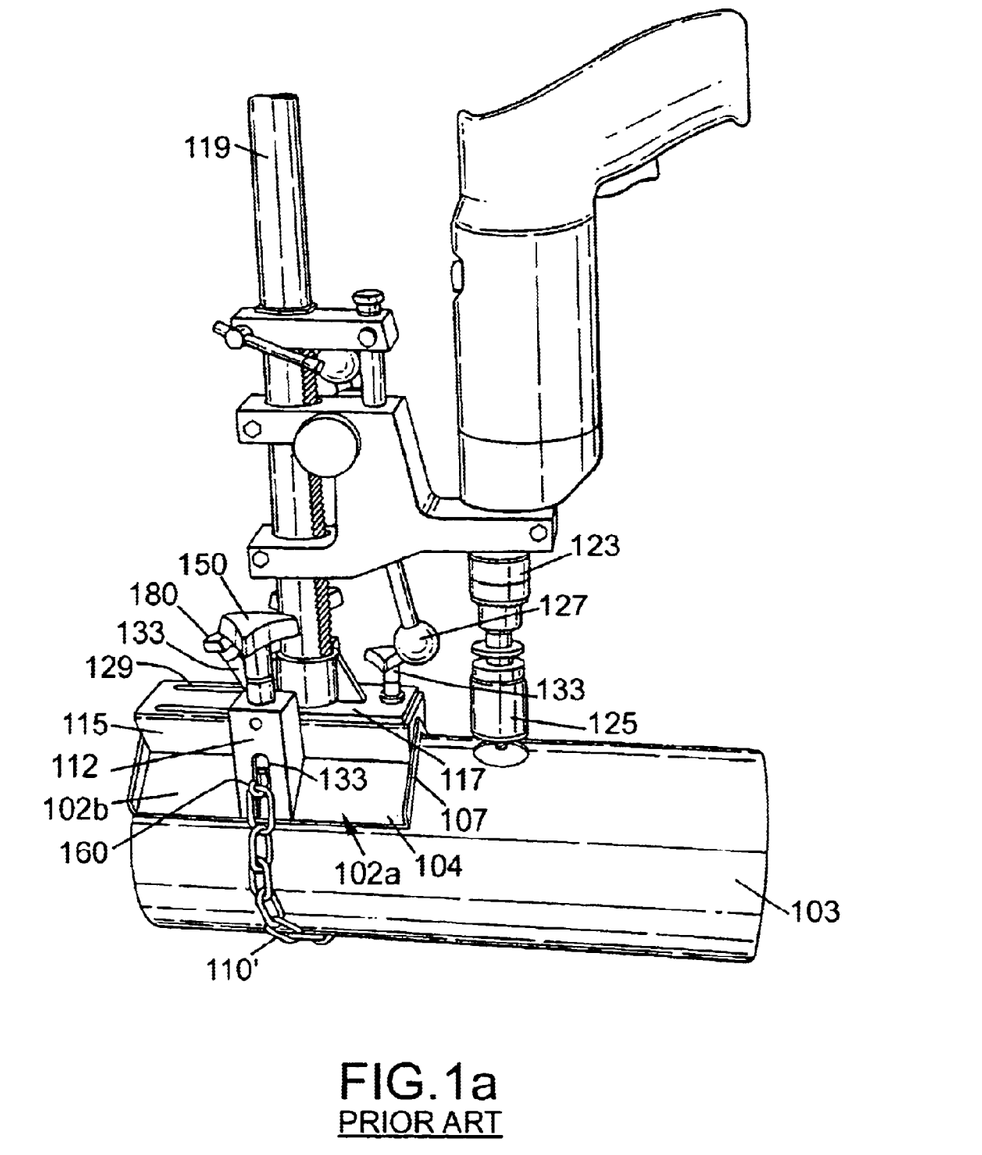
FIG. 1a shows a prior art apparatus for mounting a drill stand on a pipe.

FIG. 1a shows a prior art clamp unit of the type seen in WO98/16353 fitted to a pipe 100 of moderately large diameter. The clamp unit comprises an inverted V-shape frame 102 which is two halves 102a, 102b, which is placed against the pipe 100. A chain 110, formed from a plurality of metal links loops around the pipe. The chain 110 is pulled tight to clamp the frame on the pipe 100. The chain 10 connects to the frame 102 by means of two tension units 112, one of which bridges between the respective arms 104a, 104b and 106b, 106b of the frame halves 102a, 102b. Each tension 112 unit engages the chain 110 by means of a movable hook 160. The hook 160 can be moved towards the surface of the pipe 100, to loosen the chain, or moved away from the surface of the pipe, to tighten the chain. The particular chain link which engages with the hook may be selected according to the size of the pipe. The hook protrudes through a slot in the side of each tension unit 112, and the top 113 of the slot limits adjustment of the chain 110. A platform 115 for a drill stand is mounted on top of the frame 102. The drill press stand is mounted onto the platform, and it can be adjusted in position relative to the platform in a direction parallel to the axis of the pipe. The pipe may be drilled radially.

The frame halves 102a, 102b, tension units 112 and platform 115 are welded together.

As described more fully in WO98/16353, which is incorporated herein by reference, the V-shape frame 102 may be formed to have side flanges 107 which provide extra strength for it. The V-shape frame 102 may be formed integrally with the platform 115. A casting 117 receives a pillar 119 of a drill press stand. A drill, including a chuck 123 and a borer 125 mounted in the chuck, may be mounted on the drill press stand. It will be understood that by rotation of the drill press stand handle 127, the drill may be advanced towards or away from the pipe. In this way therefore the borer 125 may be brought selectively into contact with the pipe.

The casting 117 is mounted onto the frame 102 by means of elongate mounting holes 129 formed in the platform 115 and corresponding mounting holes formed in the casting 117. Bolts 133 pass through the holes in order to rigidly clamp (via nuts) the casting 117 to the frame 115. This allows the accurate alignment of the drill to be used with the pipe. The bolts are adjustably by rotatable handwheels 180.

Each side portion 104, 106 of the frame 102 carries a tension unit 112. Each tension unit comprises a turret, within which is housed a screw-threaded member which may be rotated manually by a rotatable handwheel 150. Rotation of the handwheels causes the screw thread to rotate and thereby selectively move a detent up or down, in this example the detent being a metal hook 160. The ends of the chain 110' may be placed over the hooks 160 of the tension units 112, and thereby the tension in the chain may be adjusted for clamping the frame 102 to the pipe. It will be apparent that only one of the hooks 160 needs to be adjustable.

When the drilling operation has been finished and it is desired to remove the frame 102 from the pipe then this is simply a matter of the user releasing the tension in the chain sufficiently for the chain to be removed from a hook 160.

Figure 1B:
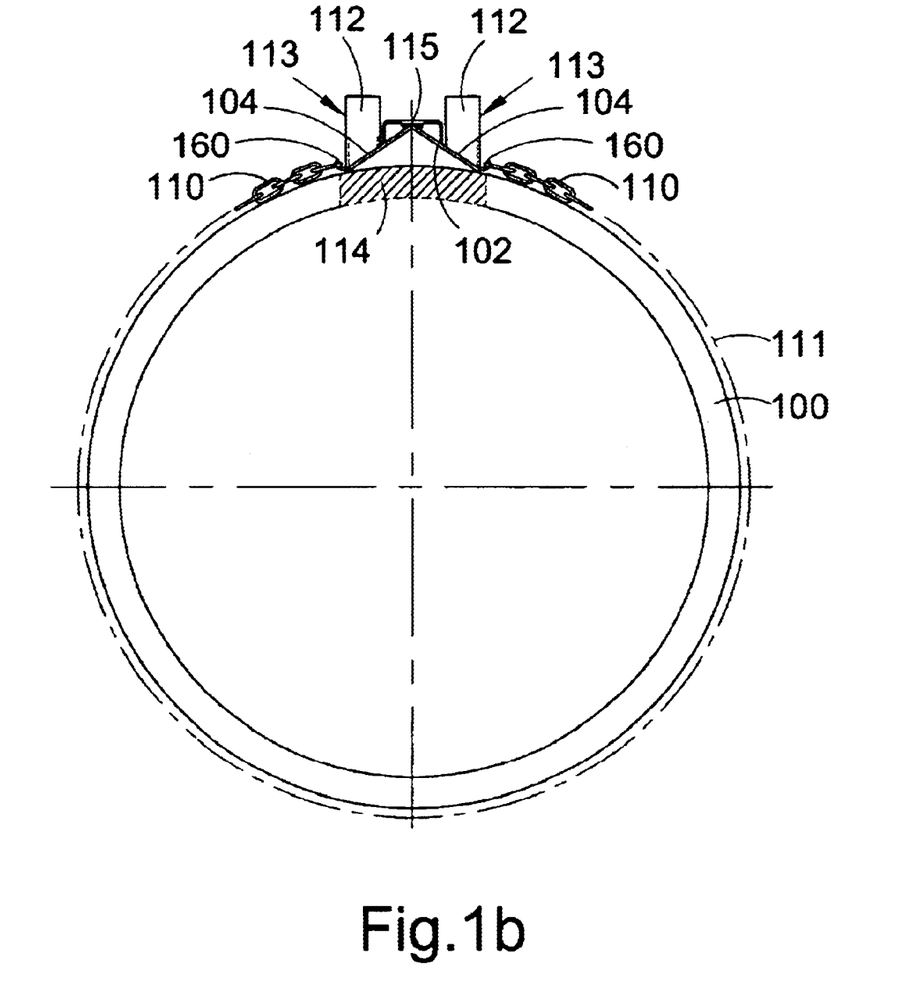
FIG. 1b shows a cross sectional view through a larger diameter pipe with the frame of FIG. 1a mounted on it.

However, this arrangement for mounting the frame 102 on the pipe has been found to work well only for a pipe of small diameter. As seen in FIG. 1b, for a pipe of large diameter, the chain meets the tension unit almost horizontally, so if the position of the hook 160 is adjusted to attempt to tighten the chain, it tends to simply lift the end of the chain off the surface of the pipe which does not sufficiently tighten the chain. Also, the frame 102 is likely to slip, as the inverted V-shape frame lies against an almost flat region of the pipe surface and there is little force pulling the frame onto the pipe surface.

Figure 2:
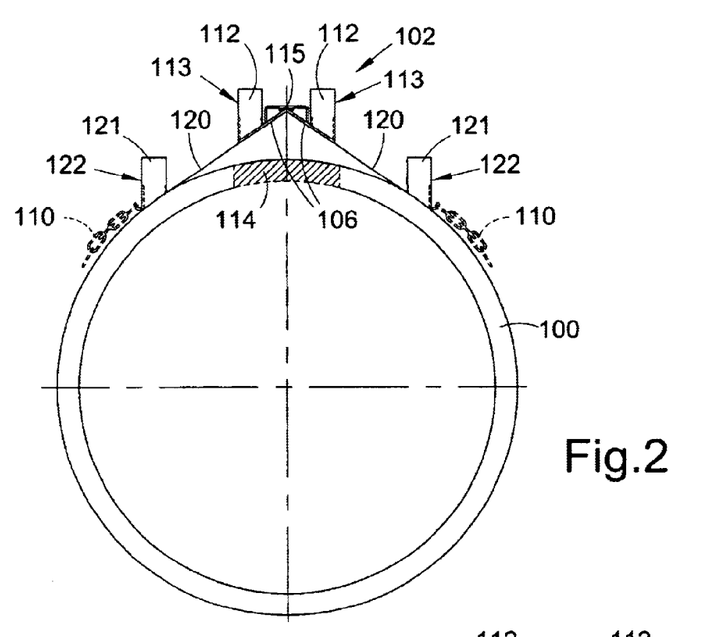
FIG. 2 shows a first embodiment of the invention.
Figure 12A:
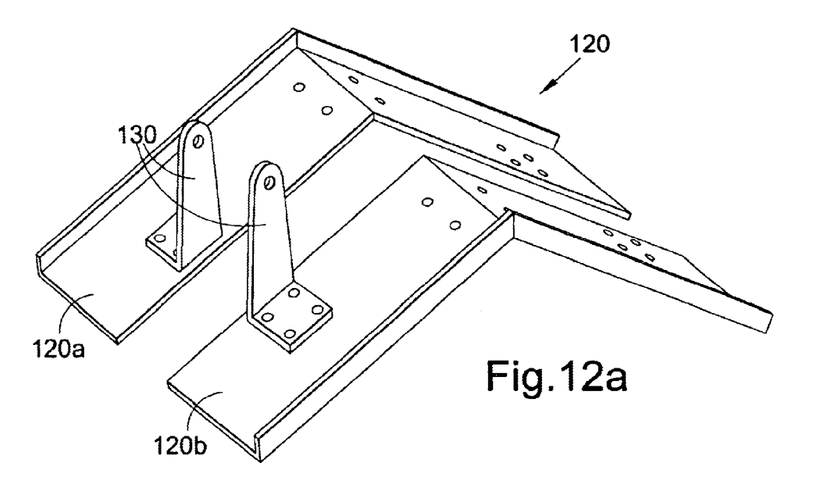
FIGS. 12a and 12b show embodiments of extension apparatus according to the invention.

FIG. 2 shows a first embodiment of the invention. A frame 102, identical to that of the prior art of FIG. 1, has a V-shaped extension plates 120 in the form of two halves 120a, 120b attached (see FIG. 12a), one to each half 102a, 102b of the frame 102. When the extension plates are attached to the frame 102, they extend the size of the V-shape of the frame 102. The extension plates may be attached by means of countersunk screws. Additional tension units 121 are provided, bridging the plate halves 120a, 120b to form an integral unit with the plate halves. The tension units 121 on the extension plates may now be used instead of the units 112 which are located on the frame 102. This arrangement greatly increases the portion of the pipe circumference which is held inside the (enlarged) V-shape frame 102, and also increases the angle at which the chain meets the tension units. Both of these effects reduce the chance of the chain 110 not tightening properly, and the frame 102 slipping during the drilling process.

The extension plate 120 is removable, so that when the clamp is used with a large pipe, the extension plate 120 will be fitted, but when the clamp is used with a small pipe the extension plate 120 will be removed. The plates have an upturned flange at one edge to provide greater rigidity.

A range of extension plates 120 may be provided to give different extension lengths, thus allowing the frame to be extended to a choice of sizes, rather than to a single extended size. This may be useful where the apparatus is used with a mixture of small, medium and large pipes. It may be desirable to have extension plates permanently attached to the V-shape frame. A single pair of tension units might be provided, located on the end of the extension plates with no tension units on the non-extendable part of the frame.

Figure 12B:
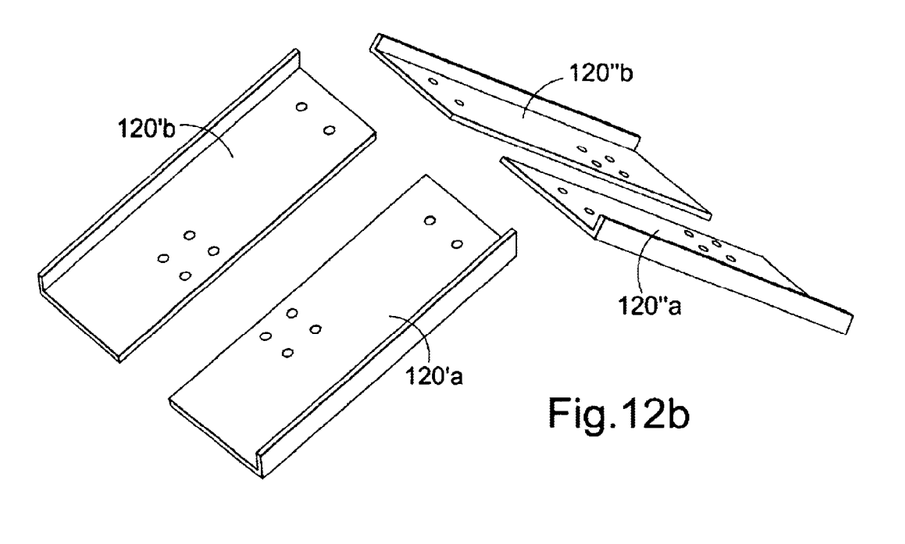

It will be appreciated that in place of a V-shaped plate half 120a or 120b, two flat plates 102', 120" (FIG. 12b) may be provided, attached to a respective arm of the frame half 102a, 102b, although this may require a much stronger connection to the frame 102 and may be more likely to flex.

Figure 3:
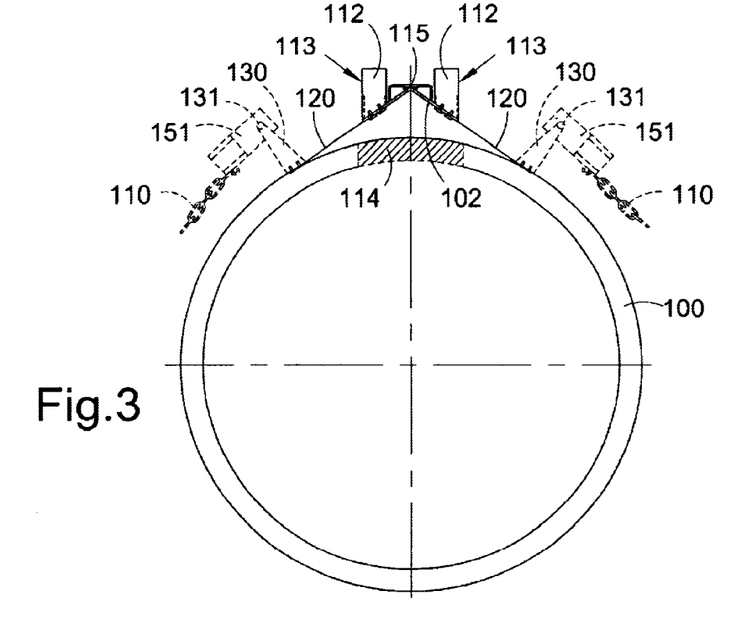
FIG. 3 shows a second embodiment of the invention.

FIG. 3 shows a second embodiment of the invention. The clamp is identical to the clamp of FIG. 2, except that a second pair of tension units 151 is now fastened to the extension plates 120 by means of pairs of brackets 130. The tension unit 151 may pivot around an axis 131, thus allowing the angle at which the tension unit 151 aligns with the chain 110 to self-adjust so that a tensioning screw inside the tension unit is 151 aligned with the end of the chain 110.

Figure 4:
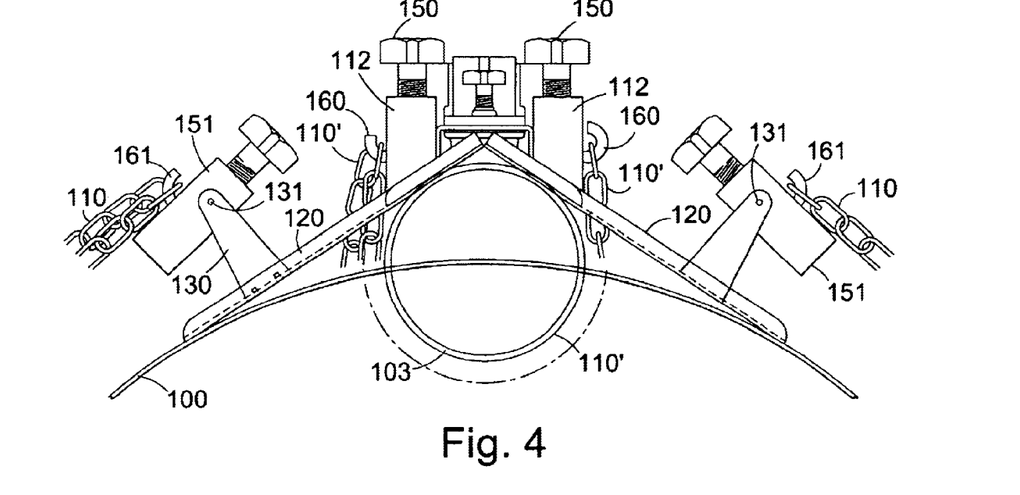
FIG. 4 shows a close up side view of the clamp of the second embodiment of the invention.

FIG. 4 shows a larger scale side view of a clamp unit according to the invention. The use of the unit with both a large pipe 100, and with a small pipe 103, is illustrated. For the small pipe 103, the extension plates 120 are unnecessary, and the chain is looped onto hooks 160 in the first pair of tension units 112. When the handwheel 150 is turned in one direction, the end of the chain is pulled upwards, and the chain tightens around the pipe 103. For use with the large pipe 100, the chain is looped onto the hooks 161 in the second pair of tension units 151. As mentioned above, these tension units may pivot about an axis 131 which runs parallel to the axis of the pipe. They will therefore self-compensate for any change in chain direction due to a larger pipe diameter.

Comparing FIG. 3 with FIG. 4, it can be seen that the tension unit 151 may be reversible, such that it can be removed and re-attached to face the hook 161 towards or away from the pipe 100. Alternatively, the tension unit may have two slits 170 (FIG. 5). which are on opposite faces, rather than a single slit. The hook 161 may be positioned in either slit.

Figure 5:
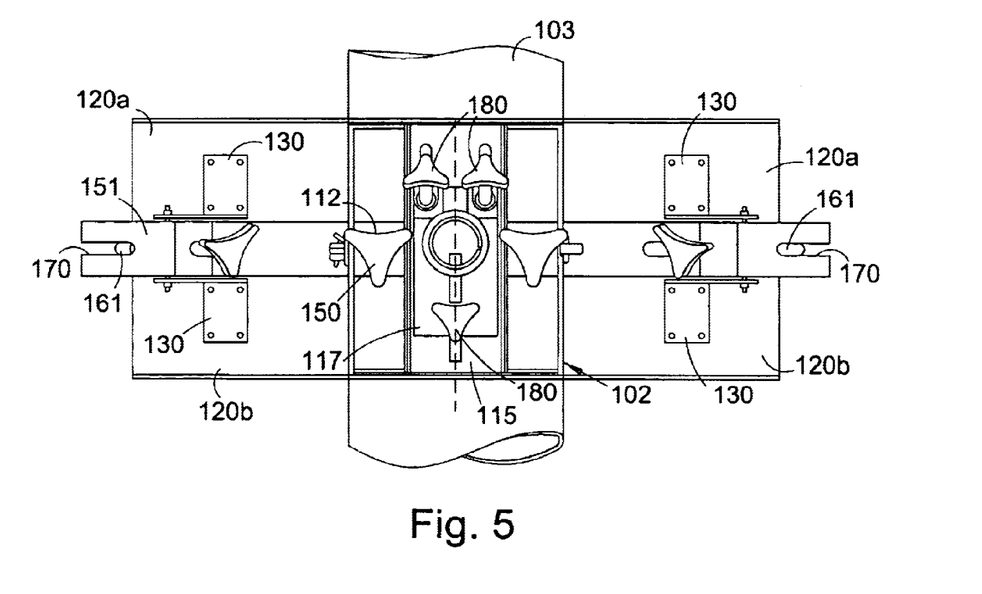
FIG. 5 shows a top view of the clamp of the second embodiment of the invention.

FIG. 5 shows a top view, corresponding to the side view shown in FIG. 4. The brackets 130 for the second pair of tension units 151 are attached to the extension plates 120 by screws. The tension unit is pivotally suspended between a pair of brackets 130.

As described above, handwheels 180, may be used to loosen the bolts 133 holding the casting 117 on the platform 115. The position of the drill relative to the frame 102 may then be adjusted and once in the correct position, the handwheels 180 used to tighten the bolts again.

Figure 6A:
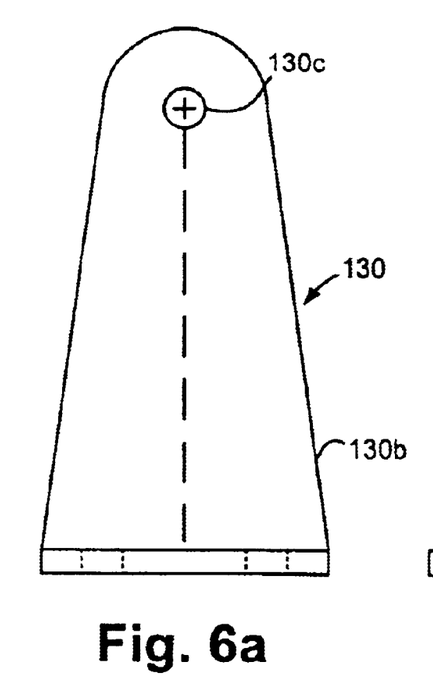
FIG. 6a shows a front elevation view of a bracket for suspending a tension unit of the second embodiment of the invention.
Figure 6B:
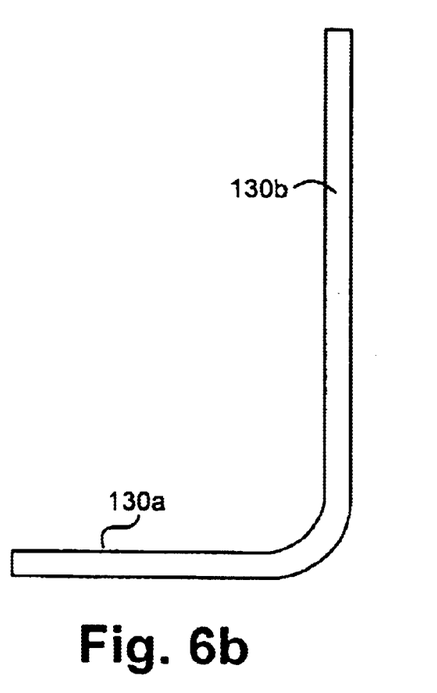
Figure 6C:
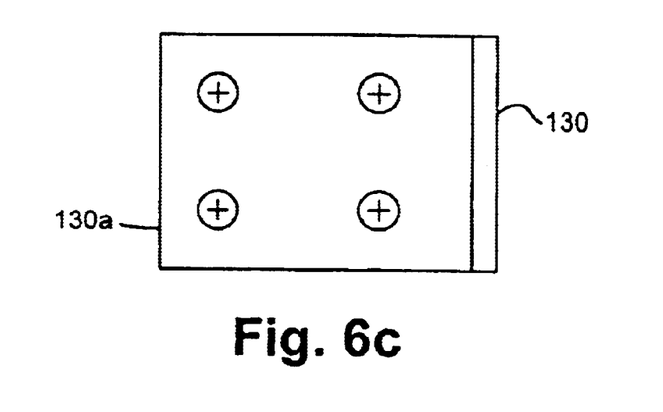
Figure 7A:
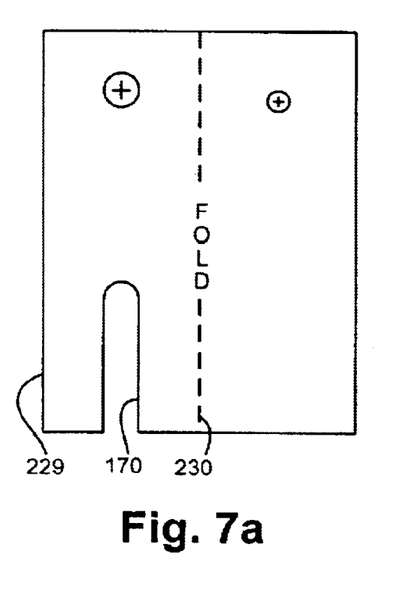
FIG. 7a shows a flat plate before folding to form a tension box section.
Figure 7B:
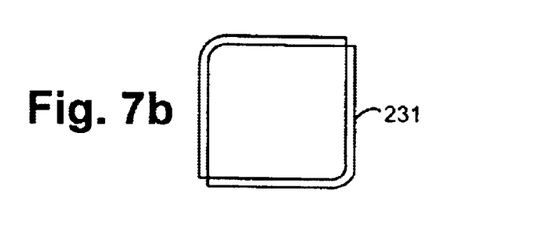
FIG. 7b shows a plan view of a tension unit housing.
Figure 7C:
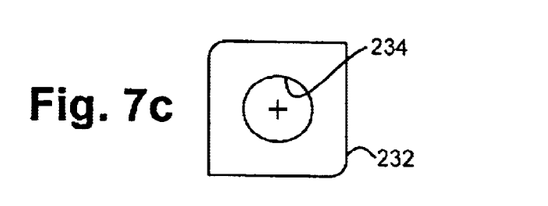
FIG. 7c shows a plan view of a top cover of the tension unit.
Figure 7D:
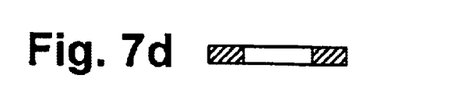
FIG. 7d shows a cross section of a top cover of the tension unit.
Figure 7E:
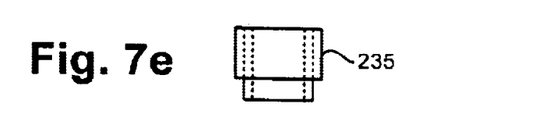
FIG. 7e shows a side view of a cylindrical section.
Figure 7F:
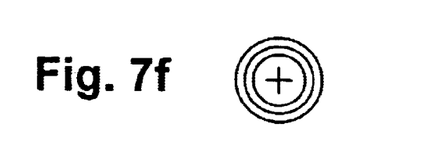
FIG. 7f shows an end view of a cylindrical section.
Figure 7G:
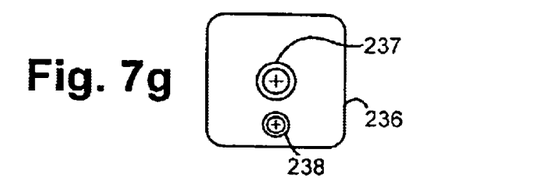
FIG. 7g shows a plan view of a mounting plate for a hook nut.
Figure 7H:
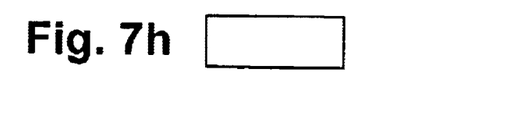
FIG. 7h shows a side view of a mounting plate for a hook nut.

FIGS. 6a through 6c show the construction of the brackets 130 for pivotally mounting the second pair of tension units 151. Each bracket has a base 130a with four bolt holes, and an uprights section 130b, perpendicular to the base, with a hole 130c for the fulcrum of the tension unit. The brackets are mounted on the extension arms 120 of the V-shape frame in pairs. The fulcrum of a tension unit 151 is suspended between each pair of brackets. The brackets are mounted by countersunk screws set into the extension plates 120 from underneath so that the screws do not foul the pipe setting.

Referring to FIGS. 7a through 7h a tension unit 151 unit is formed from two folded flat plates 229. Each plate folds along axis 230 and the two plates 229 are welded together to form a box section 231. A top cover 232 is welded into the box section 231 in order to ensure that the box section will maintain a square cross section. The top cover has a central hole 234, in which a cylindrical section 235 is inserted and welded in place. This cylindrical section 235 provides an anchor for attachment of a central threaded column. A movable hook nut 236 (see also FIG. 8) is mounted onto the central column, via a tapped hole 237. This hook nut acts as a movable platform, and has a second tapped hole 238, which accommodates a hook 161 for holding the chain.

Figure 8A:
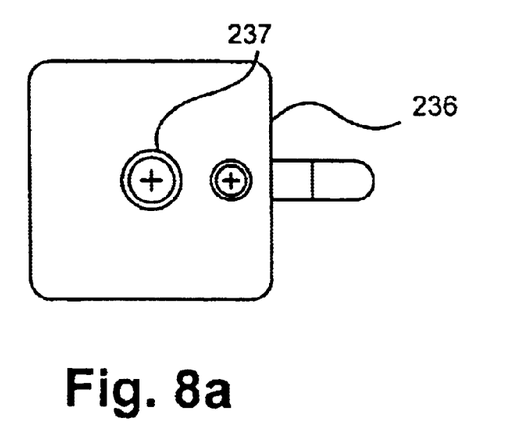
FIG. 8a shows a plan view of a hook and the mounting plate of FIGS. 7g and 7h.
Figure 8B:
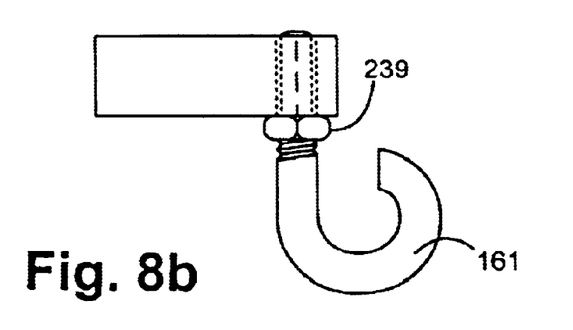
FIG. 8b shows a side view of a "P" shaped hook and the mounting niates of FIGS. 7g and 7h.
Figure 8C:
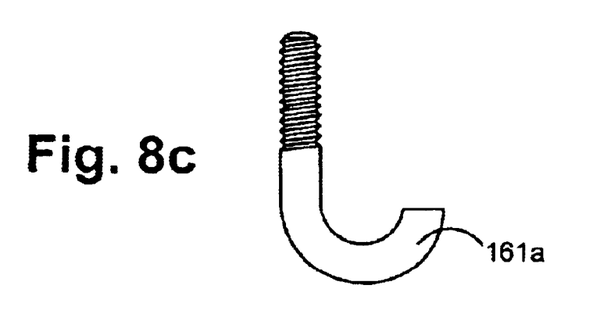
FIG. 8c shows a side view of a "U" shaped hook.

FIGS. 8A through 8c show the hook 161 attached to the movable platform 236, and held in place by a lock nut 239. The hook 161 has a threaded end, which screws into the tapped hole. The shape of the hook can be chosen according to the size and shape of the pipe, e.g. the hook can be "U" shape (FIG. 8c) or "P" shape (FIG. 8b). A "P" shape hook is used to prevent loss of the chain. It is preferable to have a "P" (closed) hook meeting one end of the chain, and a "U" (open) hook 161a meeting the other end of the chain.

The whole extension unit comprising the extension plates 120 and the tension units 121, or 151, can be unbolted from the original tool for use with normal sized pipes, to reduce weight and be more compact.

Figure 9:
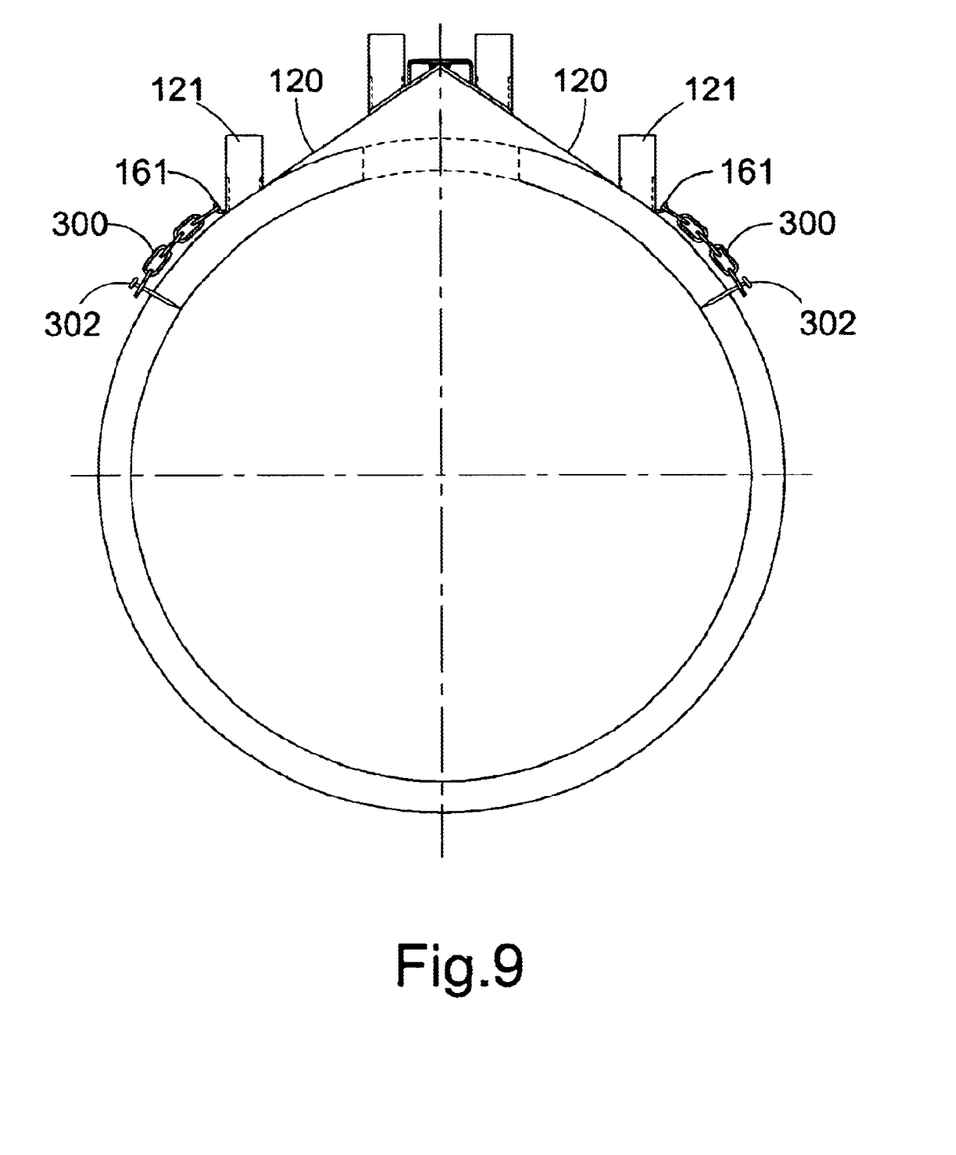
FIG. 9 shows a third embodiment of the invention in which the single chain is replaced by two short lengths, which are bolted to the pipe.

For pipes of very large diameter, for example 2 metres or more, it may be inconvenient to fasten a chain all the way around the pipe. An alternative embodiment of the invention provides two separate short lengths of chain 300 or flat linkage, instead of one single long chain. One end of each short length 300 is dropped over the hook 161 and the other end is attached direct to the pipe by a screw or stud 302, for example by a spring-loaded butterfly-type or similar fitting used on hollow structures. Another alternative is to supply a large self-tapping screw for each short link that would be sufficient for the double skinned pipes by drilling through the outer skin only, so that there would not be any problem of leakage. The hole could be plugged to prevent soil from entering the space between the two skins if necessary.

For large underground pipes it would probably be advisable to drill and tap through the pipe, and if the wall thickness is sufficient, to drill and tap a blind hole, so that there would not be a problem of leakage. With large concrete pipes up to two metres in diameter, drilling and using expanding bolts would be possible.

Figure 10:
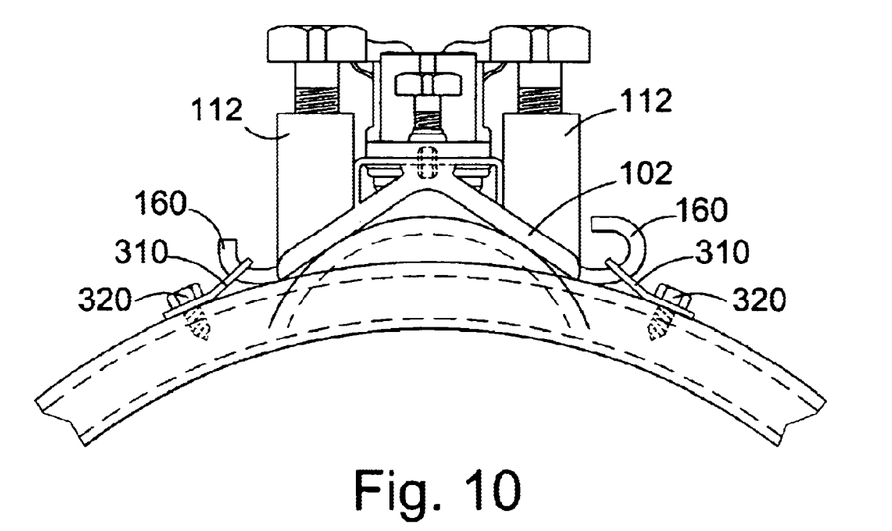
FIG. 10 shows a fourth embodiment, in which two clips are used in place of chain to bolt the clamp to the pipe.

FIG. 10 shows a frame 102 according to the invention, which is clipped to the surface of the pipe, instead of being held in place by a chain. The frame could be clipped in place either with or without the extension plates fitted. The advantage of having the extension plates fitted is that if the hole to be drilled was large a clamp with extension plates would provide a support of larger base area for operation of the drill.

Clipping the clamp to the pipe, or using short chain lengths, rather than clamping with a chain, eliminates the need to excavate the trench beyond the full depth of the pipe to allow a chain to encompass the entire circumference of the pipe. When structured wall plastic pipes are to be drilled it is probably sufficient to use two self tap screws into the outer skin only of the pipe, as the pressure upon the plastic pipe is so small that the two screws should be enough to hold the pipe-drilling tool securely in place while drilling. On steel pipes, it would be preferable to drill and tap the holes for the clip bolts or to use one of the various fixings used for hollow walls.

Clips 310 hold the frame 102 in place by looping over the hooks 160, and they anchor the frame 102 by means of screws 320 which are fastened into the surface layer of the pipe. The tension units 112 may be used to tighten the clips, and prevent the clamp from moving.

Figure 11:
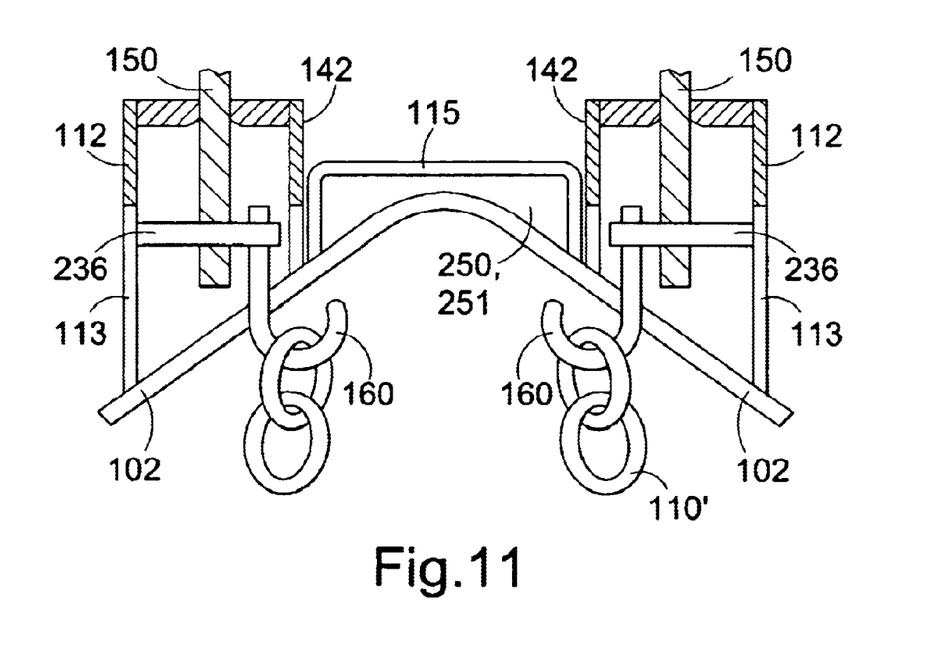
FIG. 11 illustrates a further modification in which the chain holding hooks can extend through slots in the frame, to allow smaller diameter pipes to be clamped.

The tension units 112 are welded across the gap between the frame halves 102a, 102b, as is the platform 115. The result is that the gap extends below the inner side of each tension unit 112, and can accommodate the hook 160. The hooks 160 are reversible in the tension units 112, to face inwardly. They extend down through the gap to receive the chain 110'. The inner face 242 of the tension unit 112 may be slotted to allow for maximum upward travel of the hooks 160. By facing the hooks 160 inwards, smaller diameter pipes may be clamped.

What is claimed is:

1. A detachable extension apparatus for a frame for mounting a drill on a pipe, the frame having a recess for receiving pipes of different size, and a pipe on which the drill is to be mounted partially sits within said recess and the frame is attached to the pipe, the extension apparatus being attachable to the frame to increase the size of the recess, for attaching the frame to larger size pipes.

2. A detachable extension apparatus as claimed in claim 1, wherein said frame comprises a V shape member, and said recess is formed between the arms of the V shape, and wherein said extension apparatus increases the length of the arms of the V shape member.

3. A detachable extension apparatus as claimed in claim 2, wherein said frame comprises:
 a second member which encircles a said pipe and is attached to said frame to attach the frame on the pipe; wherein said extension apparatus comprises further means for attaching the second member to the extension apparatus.

4. A detachable extension apparatus as claimed in claim 3, wherein the further means for attaching the second member comprises means for adjusting the tension in the second member.

5. A detachable extension apparatus as claimed in claim 4, wherein the further attaching means comprises a hook which is threadedly mounted on the frame, the hook being movable to tension the second member.

6. A detachable extension apparatus as claimed in claim 5, wherein the further attaching means is pivotably mounted on the frame.

7. A detachable extension for an apparatus for mounting a drill on a pipe, the apparatus for mounting the drill comprising
 a platform which includes a generally V-shaped member which abuts a pipe to be drilled,
 the extension comprising means to increase the length of the arms of the V-shaped member.

8. Apparatus according to claim 7, further comprising means for attaching the platform on a pipe to be drilled, the attaching means comprising a second member extendable around the pipe and releasably connectable at one end to the platform or the extension.

9. Apparatus according to claim 8, further comprising means for adjusting the tension in the second member.

10. Apparatus according to claim 9, wherein the means for adjusting the tension comprises a screw threaded detent.

11. Apparatus according to claim 7, wherein the platform includes a pillar housing for receiving the pillar of a drill press stand.

12. Apparatus according to claim 7, wherein a pillar housing or a drill press stand is mounted on the platform by bolts extending through elongate holes in the platform to allow the pillar housing or the drill press stand to be slidably adjusted relative to the platform.

13. Apparatus according to claim 8, wherein the second member comprises a chain.

14. An apparatus for mounting a drill on a pipe wherein the apparatus extends around only a part of the pipe circumference, and is removably fixed to the pipe by fixing means which penetrate the surface of the pipe, the apparatus further comprising:
   a platform which includes a V-shaped member which abuts a pipe to be drilled; and means for mounting a drill stand on the platform, wherein the means for mounting the drill press stand on the platform allows the position of the drill press stand to be adjusted relative to the platform.

15. An apparatus for mounting a drill on a pipe, the apparatus for mounting the drill comprising
   a platform which includes a first V-shaped member which abuts a pipe to be drilled;
   means for attaching the platform to a pipe to be drilled; and
   means for mounting a drill stand on the platform wherein the means for mounting the drill press stand on the platform allows the position of the drill press stand to be adjusted relative to the platform, characterized in that the relative adjustment between the drill press stand and the platform is in a direction parallel to the axis of the pipe to be drilled, whereby the pipe may be drilled radially, the apparatus having a means for increasing the pipe diameter receivable by the first V-shaped member.

16. Apparatus as claimed in claim 15, wherein the means for increasing the pipe diameter receivable further comprises a second V shaped member, the second V shaped member being received within a recess of the first V-shaped member.

17. Apparatus as claimed in claim 15, wherein the means for increasing the pipe diameter receivable further comprises a plurality of substantially flat plates which are attachable to arms of the first V-shaped member.

* * * * *